(12) United States Patent
Shukh et al.

(10) Patent No.: US 7,554,765 B2
(45) Date of Patent: Jun. 30, 2009

(54) MAGNETIC HEAD FOR PERPENDICULAR RECORDING WITH SUPPRESSED SIDE WRITING AND ERASING

(75) Inventors: Alexander M. Shukh, Savage, MN (US); Nurul Amin, Woodbury, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 546 days.

(21) Appl. No.: 10/459,098

(22) Filed: Jun. 11, 2003

(65) Prior Publication Data

US 2004/0252415 A1 Dec. 16, 2004

(51) Int. Cl.
G11B 5/147 (2006.01)
(52) U.S. Cl. .................................. 360/125.12
(58) Field of Classification Search ................. 360/125, 360/126, 125.12
See application file for complete search history.

(56) References Cited

U.S. PATENT DOCUMENTS

| | | | |
|---|---|---|---|
| 5,157,570 A * | 10/1992 | Shukovsky et al. ......... | 360/126 |
| 5,388,019 A | 2/1995 | Argyle et al. | |
| 5,792,547 A * | 8/1998 | Liu et al. .................... | 428/212 |
| 6,122,144 A | 9/2000 | Chang et al. | |
| 6,233,116 B1 * | 5/2001 | Chen et al. .................. | 360/126 |
| 6,282,056 B1 | 8/2001 | Feng et al. | |
| 6,791,796 B2 * | 9/2004 | Shukh et al. ................ | 360/126 |
| 2002/0071208 A1 | 6/2002 | Batra et al. | |
| 2002/0176214 A1 | 11/2002 | Shukh et al. | |
| 2003/0026039 A1 | 2/2003 | Okada et al. | |

* cited by examiner

Primary Examiner—David D Davis
(74) Attorney, Agent, or Firm—Kinney & Lange, P.A.

(57) ABSTRACT

A magnetic head for perpendicular recording having reduced side writing and erasing is disclosed. The writer portion of the magnetic head includes a main pole and a return pole. The main pole includes a multilayer main pole tip and a multilayer yoke. The layers of the main pole tip and the yoke are antiferromagnetically coupled to each other with a non-magnetic metal. Antiferromagnetic coupling between the layers of the main pole tip and the yoke dramatically reduces fringing flux emanated from the sides of the main pole intending to close through an upper portion of the return pole. A biasing antiferromagnetic layer is coupled to the upper portion of the return pole to bias the return pole parallel to the air bearing surface. This prevents or reduces the effect of domain wall formation in the return pole, which results in further reduction in side writing and erasing.

21 Claims, 6 Drawing Sheets

MAGNETIC HEAD FOR PERPENDICULAR RECORDING WITH SUPPRESSED SIDE WRITING AND ERASING

BACKGROUND OF THE INVENTION

The present invention relates generally to the field of merged read/write magnetic heads. In particular, the present invention relates to a magnetic head for perpendicular recording having a writer portion with suppressed side writing and erasing.

In an electronic data storage and retrieval system, a transducing head typically includes a writer for storing magnetically-encoded information on a magnetic disc and a reader for retrieving that magnetically-encoded information from the magnetic disc. The reader typically consists of two shields and a magnetoresistive (MR) sensor positioned between the shields. Magnetic flux from the surface of the disc causes oscillation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

For a perpendicular recording head, the writer portion typically consists of a main pole and a return pole, which are separated from each other at an air bearing surface of the writer by a gap layer, and which are connected to each other at a region distal from the air bearing surface by a back gap closer or back via. One or more layers of conductive coils are positioned between the main and return poles, and are encapsulated by insulating layers. The writer portion and the reader portion may be arranged in a merged configuration in which a shared pole serves as both the top shield in the reader portion and the return pole in the writer portion.

To write data to the magnetic media, an electric current is caused to flow through the conductive coils to induce a magnetic field across the write gap between the main and return poles. By reversing the direction of the current through the coils, the polarity of the data written to the magnetic media is reversed. Because the main pole is generally the trailing pole of the main and return poles, the main pole is used to physically write the data to the magnetic media. Accordingly, it is the main pole that defines the track width of the written data. More specifically, the track width is defined by the width of the main pole at the air bearing surface.

In conventional perpendicular recording heads, the main pole and the return pole are fabricated such that their magnetizations point in the same direction parallel to the ABS. Due to the magnetization directions of return pole and main pole, magnetic flux emanates from the side edges of main pole and tends to close through an upper portion of the return pole. As magnetic flux closes from the main pole through the return pole, the magnetization in an upper portion of the return pole reverses direction to align with magnetic flux direction. This results in the formation of domain wall in the upper portion of the return pole under the main pole. Fringing fields emanate from the domain wall that forms in the return pole. The soft magnetic underlayer of double-layer perpendicular recording media magnifies these fringing fields. The fringing fields can be strong enough to partially or completely erase information recorded on adjacent tracks of the recording medium. Thus, there is a need in the art for a merged read/write head for perpendicular recording with suppressed side writing and erasing caused by domain walls in the return pole.

BRIEF SUMMARY OF THE INVENTION

The present invention is a magnetic head for perpendicular recording having reduced side writing and erasing. The writer portion of the magnetic head includes a main pole and a return pole. The main pole includes a multilayer main pole tip and a multilayer yoke. The layers of the main pole tip and the yoke are antiferromagnetically coupled to each other by means of a non-magnetic metal. Antiferromagnetic coupling between the layers of the main pole tip and the yoke dramatically reduces fringing flux emanated from the sides of the main pole intending to close through an upper portion of the return pole. A biasing antiferromagnetic layer is coupled to the upper portion of the return pole to bias the return pole parallel to the air bearing surface. This prevents or reduces the effect of domain wall formation in the return pole, which results in further reduction in side writing and erasing.

DETAILED DESCRIPTION

Figure 1:
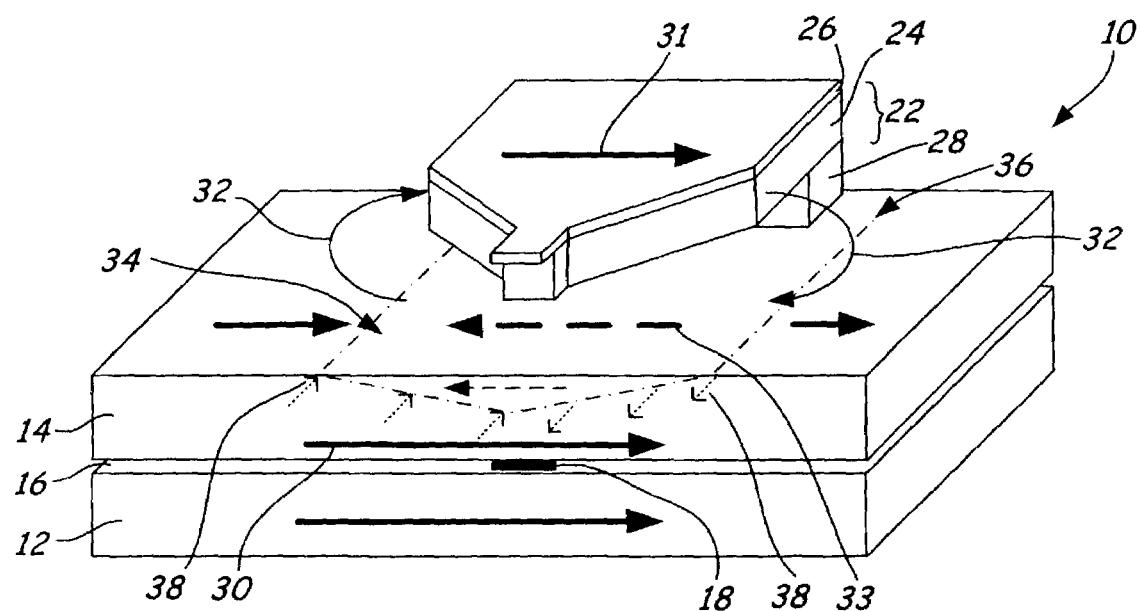
FIG. 1 is a perspective air bearing surface (ABS) view of a conventional giant magnetoresistive (GMR) read/write head for perpendicular recording.

FIG. 1 is a perspective air bearing surface (ABS) view of a conventional merged giant magnetoresistive (GMR) read/write head 10 for perpendicular recording. GMR head 10 includes a reader portion comprising bottom shield 12 and top shield/return pole 14, with non-magnetic read gap 16 positioned therebetween. GMR sensor 18 is positioned in non-magnetic read gap 16 between bottom shield 12 and top shield/return pole 14. GMR head 10 also includes writer portion comprising top shield/return pole 14 and main pole 22. Main pole 22 includes yoke 24 and main pole tip 26, and is connected to top shield/return pole 14 by back gap closer 28. Top shield/return pole 14 functions both as a shield for the reader portion and as a return pole for the writer portion.

To write data to a magnetic medium, an electric current is caused to flow through a conductive coil (not shown), which surrounds back gap closer 28 and passes through the write gap area between main pole 22 and return pole 14. This induces a magnetic field across the write gap between main pole 22 and return pole 14. By reversing the direction of the current through the coil, the polarity of the data written to the magnetic media is reversed. Because main pole 22 operates as the trailing pole, main pole 22 is used to physically write the data to the magnetic media. Accordingly, it is main pole 22 that defines the track width of the written data. More specifically, the track width is defined by the width of the trailing edge of main pole 22 at the ABS.

Return pole 14 and main pole 22 are fabricated such that their magnetizations point in the same direction parallel to the ABS. This is shown by magnetization direction 30 on return pole 14 and magnetization direction 31 on main pole 22. Due to the magnetization directions of return pole 14 and main pole 22, magnetic flux 32 emanates from the side edges of main pole 22. Magnetic flux 32 tends to close through an upper portion of return pole 14, as shown in FIG. 1.

As magnetic flux 32 loops from main pole 22 through return pole 14, magnetization 33 in domain 34 of return pole 14 reverses direction to align with magnetic flux 32 flowing through an upper portion of return pole 14. Thus, magnetization 33 in domain 34 points antiparallel to magnetization 30 in a lower portion of return pole 14 and magnetization 31 in main pole 22. This results in the formation of domain wall 36 in the upper portion of return pole 14 under main pole 22. Domain 34 has a triangular shape along the ABS and is exposed to the ABS in the upper portion of return pole 14. The exposure of domain 34 at the ABS generates fringing magnetic field 38. Fringing magnetic field 38 is strongest at the interface between domain wall 36 and an upper surface of return pole 14 adjacent to main pole 22.

As GMR head 10 passes over the surface of a magnetic medium, fringing magnetic field 38 is exposed to the medium. In perpendicular recording systems, a double layer magnetic medium, including a high coercivity thin storage layer with perpendicular-to-plane anisotropy and a soft magnetic underlayer with in-plane anisotropy and relatively high permeability, is typically used to increase the efficiency of the write head. This soft magnetic underlayer magnifies fringing magnetic field 38. As a result, fringing magnetic field 38 can be strong enough to partially or completely erase information recorded on adjacent tracks in the medium.

Figure 2:
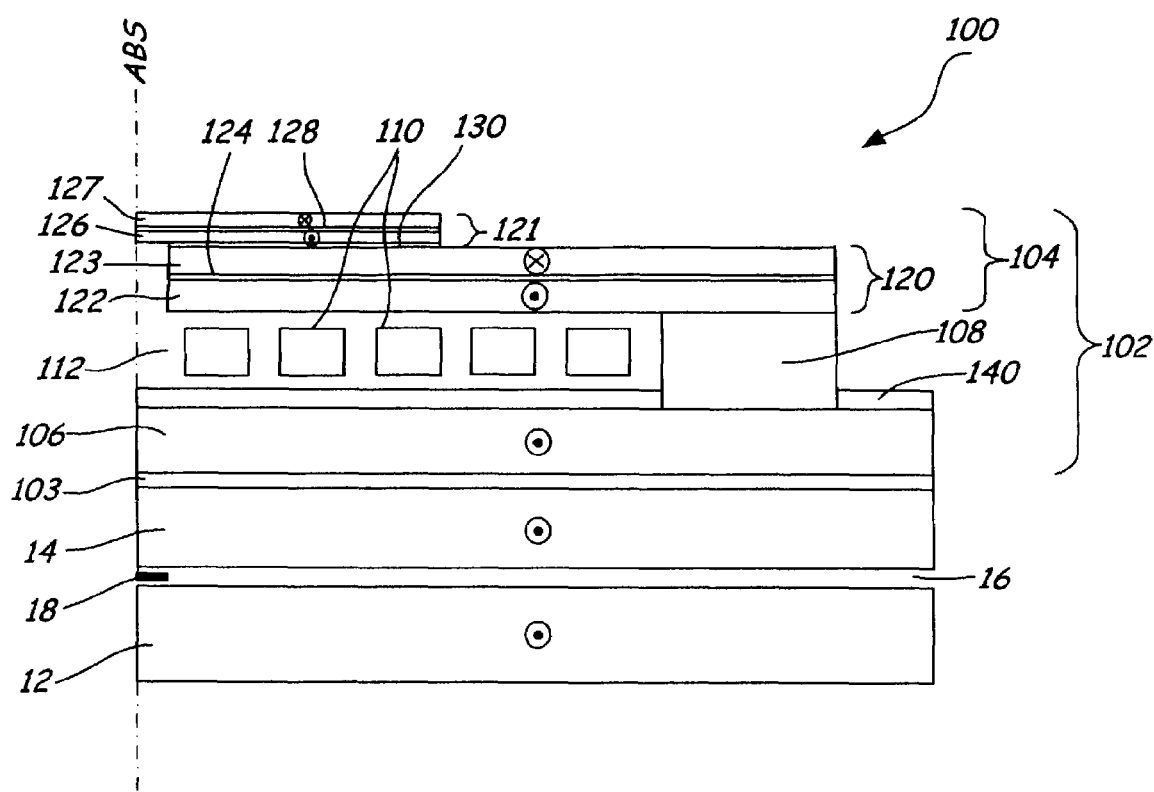
FIG. 2 is a cross-sectional view of a GMR read/write head for perpendicular recording according to one embodiment of the present invention.
Figure 3:
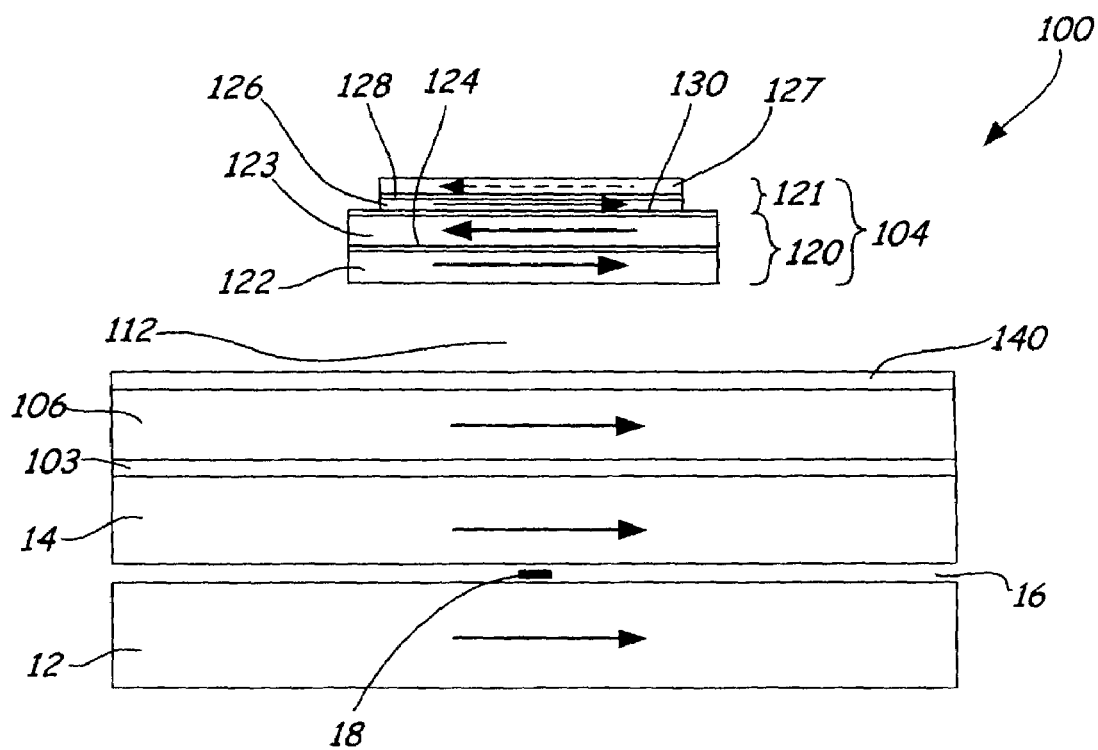
FIG. 3 is an ABS view of the GMR read/write head shown in FIG. 2.
Figure 4:
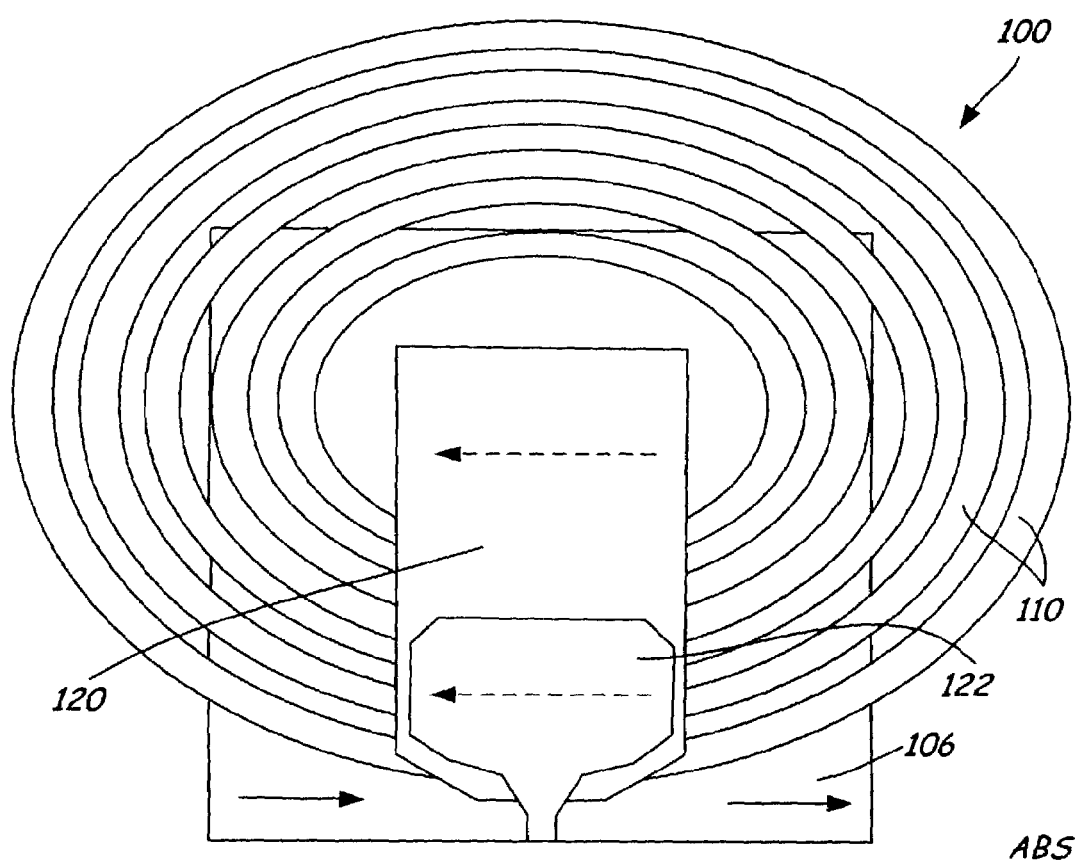
FIG. 4 is a top view of the GMR read/write head shown in FIG. 2.

FIG. 2 is a cross-sectional view of GMR read/write head 100 for perpendicular recording according to one embodiment of the present invention. FIGS. 3 and 4 show an ABS view and a top view, respectively, of GMR head 100 shown in FIG. 2, and thus will be described in conjunction therewith. GMR head 100 includes a reader portion comprising bottom shield 12, top shield 14, with non-magnetic read gap 16 positioned therebetween. GMR read sensor 18 is positioned in non-magnetic read gap 16 between bottom shield 12 and top shield 14.

GMR head 100 also includes writer portion 102 having reduced side writing and erasing. Writer portion 102 is separated from the reader portion by a non-magnetic spacer 103. Writer portion 102 includes main pole 104 and return pole 106 connected to each other distal from the ABS by back gap closer 108. Conductive coil 110 is positioned between main pole 104 and return pole 106, and is electrically isolated from main pole 104 and return pole 106 in write gap 112. Main pole 104 includes yoke 120 and main pole tip 121. Main pole tip 121 is preferably made of a high magnetic moment material (saturation magnetic flux density of at least 1.5 T, and preferably $\geq 2.0$ T), such as $Ni_{45}Fe_{55}$, CoNiFe, CoFe, CoFeV, CoFeMn, CoFeCr, FeN, FeAlN, FeTaN, or similar materials. Main pole tip 121 is formed on an upper flat surface of yoke 120. Yoke 120 is made of a material having well-defined anistropy, high permeability (relative permeability of at least 500, and preferably $\geq 1000$), and low coercivity (not more than 10 Oe, and preferably $\leq 5$ Oe), such as NiFe, CoNiFe, CoFe, CoFeV, CoFeCr, or CoFeMn. This configuration increases the efficiency of writer 102, and improves anisotropy and reduces coercivity of main pole tip 121, which is important for preventing on-track erasure. Return pole 106 is preferably made of a material having a low magnetic moment (saturation magnetic flux density about $\leq 1.5$ T), such as $Ni_{79}Fe_{21}$, CoZn, CoNbZn, or other similar Co- or Fe-based alloys.

To eliminate or substantially reduce the fringing magnetic flux emanating from the main pole and closing through the return pole (as in FIG. 1), yoke 120 and main pole tip 121 have a multilayer structure with antiferromagnetic coupling between the layers. Yoke 120 includes first ferromagnetic layer 122 and second ferromagnetic layer 123 antiferromagnetically coupled to each other by means of non-magnetic layer 124. Similarly, main pole tip 121 includes first ferromagnetic layer 126 and second ferromagnetic layer 127 antiferromagnetically coupled to each other by means of non-magnetic layer 128. The number of ferromagnetic and non-magnetic layers in yoke 120 and main pole tip 121 may be varied as design requirements dictate. Yoke 120 and main pole tip 121 are also antiferromagnetically coupled to each other with non-magnetic layer 130. Non-magnetic layers 124, 128, and 130 are preferably made of a non-magnetic metal, such as Ru, Cu, Cr, or similar material. In GMR head 100, the magnetizations of adjacent antiferromagnetically coupled magnetic layers are oriented antiparallel with respect to each other. This is shown by the magnetization arrows on each of the ferromagnetic layers. By antiferromagnetically coupling adjacent magnetic layers, fringing magnetic flux is eliminated or substantially reduced since the antiferromagnetic coupling opposes flux closure between main pole 104 and return pole 106.

To eliminate or further reduce the effect of any remaining fringing magnetic flux, biasing antiferromagnetic layer 140 is exchange coupled to return pole 106. Biasing antiferromagnetic layer 140 is preferably formed in direct contact with an upper surface of return pole 106, directly across write gap 112 from main pole 104. Biasing antiferromagnetic layer 140 biases return pole 106 parallel to the ABS. By forming biasing antiferromagnetic layer 140 directly on return pole 106, a strong exchange coupling occurs between return pole 106 and antiferromagnetic layer 140. This exchange coupling produces the bias field that biases return pole 106 parallel to the ABS and increases the unidirectional anisotropy of return pole 106. The increased anisotropy of return pole 106 resists the formation of opposite domains (and thus the formation of a domain wall) in return pole 106 caused by fringing magnetic flux from main pole 104. If a domain wall forms in return pole 106, biasing antiferromagnetic layer 140 broadens the domain wall to reduce the effect of the fringing field (e.g., field 38 in FIG. 1) emanating from the domain wall. Biasing antiferromagnetic layer 140 is preferably made of an antiferromagnetic Mn-based alloy, such as MnFe, MnPt, MnNi, or similar alloys.

As noted above, return pole 106 is preferably made of a material having a low magnetic moment. In using a material having a low magnetic moment, a domain wall formed in return pole 106 generates only a weak fringing field. This weak fringing field is not strong enough to exceed the nucleation field of the perpendicular media (the field at which nucleation of a domain of opposite magnetization starts). Thus, the use of a material having a low magnetic moment for return pole 106 prevents side writing or erasure of data recorded on tracks adjacent to the track being written by writer 102.

Figure 5:
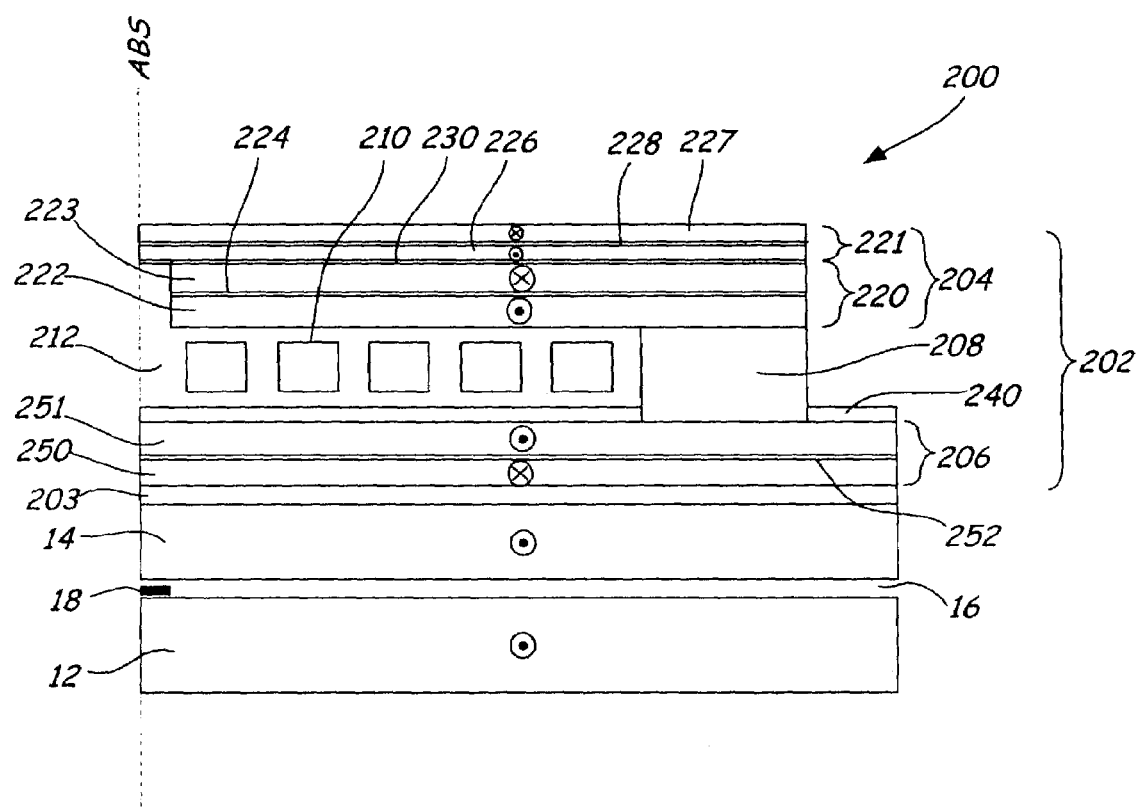
FIG. 5 is a cross-sectional view of a GMR read/write head for perpendicular recording according to another embodiment of the present invention.
Figure 6:
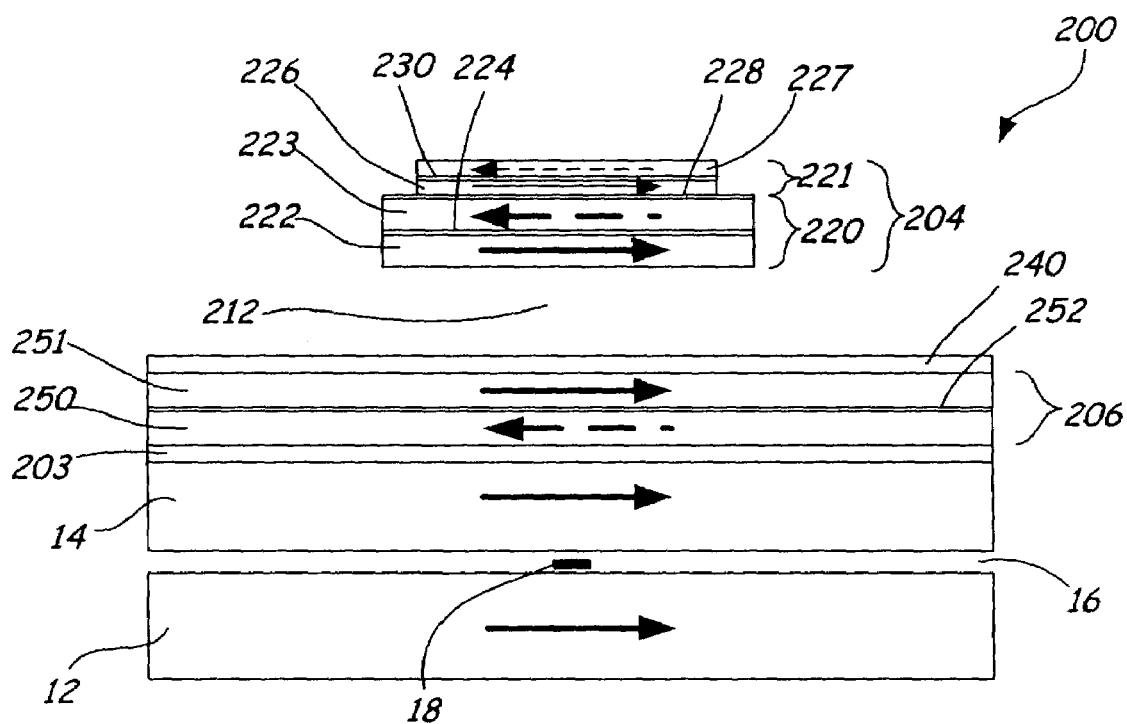
FIG. 6 is an ABS view of the GMR read/write head shown in FIG. 5.

FIG. 5 is a cross-sectional view and FIG. 6 is an ABS view of GMR read/write head 200 for perpendicular recording according to another embodiment of the present invention. GMR head 200 includes a reader portion comprising bottom shield 12, top shield 14, with non-magnetic read gap 16 positioned therebetween. GMR read sensor 18 is positioned within non-magnetic read gap 16 between bottom shield 12 and top shield 14.

GMR head 200 also includes writer portion 202 having reduced side writing and erasing. Writer portion 202 is separated from the reader portion by a non-magnetic spacer 203. Writer portion 202 includes main pole 204 and return pole 206 connected to each other distal from the ABS by back gap closer 208. Conductive coil 210 is positioned between main pole 204 and return pole 206, and is electrically isolated from main pole 204 and return pole 206 in write gap 212. Main pole 204 includes yoke 220 and main pole tip 221. Main pole tip 221 is preferably made of a high magnetic moment material (saturation magnetic flux density of at least 1.5 T, and preferably $\geqq 2.0$ T), such as $Ni_{45}Fe_{55}$, CoNiFe, CoFe, CoFeV, CoFeMn, CoFeCr, FeN, FeAlN, FeTaN, or similar material. Main pole tip 221 is formed on an upper flat surface of yoke 220. Yoke 220 is made of a material having well-defined anistropy, high permeability (relative permeability of least 500, preferably $\geqq 1000$), and low coercivity (not more than 10 Oe, and preferably $\leqq 5$ Oe), such as NiFe, CoNiFe, CoFe, CoFeV, CoFeCr, CoFeMn, or similar material. This configuration increases the efficiency of writer 202, and improves anisotropy and reduces coercivity of the main pole tip, which is important for preventing on-track erasure.

To eliminate or substantially reduce the fringing magnetic flux emanating from the main pole and closing through the return pole (as in FIG. 1), yoke 220 and main pole tip 221 have a multilayer structure with antiferromagnetic coupling between the layers. Yoke 220 includes first ferromagnetic layer 222 and second ferromagnetic layer 223 antiferromagnetically coupled to each other with non-magnetic layer 224. Similarly, main pole tip 221 includes first ferromagnetic layer 226 and second ferromagnetic layer 227 antiferromagnetically coupled to each other with non-magnetic layer 228. The number of ferromagnetic and non-magnetic layers in yoke 220 and main pole tip 221 may be varied as design requirements dictate. Non-magnetic layers 224 and 228 are preferably made of a non-magnetic metal, such as Ru, Cu, Cr, or similar material. Yoke 220 and main pole tip 221 are also antiferromagnetically coupled to each other with non-magnetic layer 230. In GMR head 200, the magnetizations of adjacent antiferromagnetically coupled magnetic layers are oriented antiparallel with respect to each other. This is shown by the magnetization arrows on each of the ferromagnetic layers. By antiferromagnetically coupling adjacent magnetic layers, fringing magnetic flux is eliminated or substantially reduced since the antiferromagnetic coupling opposes flux closure between main pole 204 and return pole 206.

To eliminate or further reduce the effect of any remaining fringing magnetic flux, biasing antiferromagnetic layer 240 is exchange coupled to return pole 206. Biasing antiferromagnetic layer 240 is preferably formed in direct contact with an upper surface of return pole 206. Return pole 206 in GMR head 200 differs from return pole 106 in GMR head 100 (FIGS. 2-4) in that return pole 206 has a multilayer structure including first ferromagnetic layer 250 and second ferromagnetic layer 251 antiferromagnetically coupled to each other with non-magnetic layer 252. Biasing antiferromagnetic layer 240 biases second ferromagnetic layer 251 parallel to the ABS. By forming biasing antiferromagnetic layer 240 directly on return pole 206, a strong exchange coupling occurs between return pole 206 and antiferromagnetic layer 240. This exchange coupling produces the bias field that biases second ferromagnetic layer 251 of return pole 206 parallel to the ABS and increases the unidirectional anisotropy of second ferromagnetic layer 251. The increased anisotropy of second ferromagnetic layer 251 resists the formation of opposite domains (and thus the formation of a domain wall) in second ferromagnetic layer 251 caused by fringing magnetic flux from main pole 204. The multilayer structure of return pole 206 further increases the magnetic anisotropy of return pole 206. If a domain wall forms in second ferromagnetic layer 251, biasing antiferromagnetic layer 240 broadens the domain wall to reduce the effect of the fringing field (e.g., field 38 in FIG. 1) emanating from the domain wall.

Return pole 206, and in particular second ferromagnetic layer 251, is preferably made of a material having a low magnetic moment (saturation magnetic flux density of about $\leqq 1.5$ T), such as $Ni_{79}Fe_{21}$, CoZn, CoNbZn, or other similar Co- or Fe-based alloys. In using a material having a low magnetic moment, a domain wall formed in second ferromagnetic layer 251 generates only a weak fringing field. This weak fringing field is not strong enough to exceed the nucleation field of the perpendicular media (the field at which nucleation of a domain of opposite magnetization starts). Thus, the use of a material having a low magnetic moment in return pole 206 prevents side writing or erasure of data recorded on tracks adjacent to the track being written by writer 202.

In summary, domain walls form in conventional perpendicular recording heads when magnetic flux emanates from the side of the main pole and closes through an upper portion of the return pole. Fringing fields which emanate from the domain walls can result in off-track side writing or erasing. The present invention is a magnetic head for perpendicular recording having reduced side writing and erasing. The main pole of the writer portion includes a multilayer main pole tip and a multilayer yoke. The layers of the main pole tip and the yoke are antiferromagnetically coupled to each other with a non-magnetic metal. Antiferromagnetic coupling between the layers of the main pole tip and the yoke dramatically reduces fringing flux emanated from the sides of the main pole intending to close through an upper portion of the return pole. A biasing antiferromagnetic layer is coupled to the upper portion of the return pole to bias the return pole parallel to the air bearing surface. This prevents or reduces the effect of domain wall formation in the return pole, which results in further reduction in side writing and erasing. The return pole is preferably made of a material having a low magnetic moment, which weakens any remaining fringing field emanating from domain walls such that it does not exceed the nucleation field of the perpendicular medium. The return pole may also have a multilayer structure with antiferromagnetic coupling between the layers to increase magnetic anisotropy of the return pole and to prevent domain wall formation in the return pole.

Although the present invention has been described with reference to preferred embodiments, workers skilled in the art will recognize that changes may be made in form and detail without departing from the spirit and scope of the invention.

The invention claimed is:

1. A magnetic writer comprising:
   a main pole including a multiple layer first portion and a multiple layer second portion, wherein at least one of the first portion and the second portion includes two magnetic layers having substantially antiparallel magnetizations and separated by a first nonmagnetic layer, and wherein the first portion and the second portion are non-coplanar;
   a return pole across a write gap from the main pole; and
   a biasing layer comprised of an antiferromagnetic material adjacent the return pole at the write gap for biasing the return pole.

2. The magnetic writer of claim 1, wherein the magnetic layers are ferromagnetic layers.

3. The magnetic writer of claim 1, wherein the first portion comprises a high magnetic moment material.

4. The magnetic writer of claim 1, wherein the second portion comprises a soft magnetic material having high permeability and low coercivity.

5. The magnetic writer of claim 1, and further comprising:
a second nonmagnetic layer between the first portion and the second portion.

6. The magnetic writer of claim 1, wherein the return pole comprises a multilayer structure including ferromagnetic layers antiferromagnetically coupled to each other by a non-magnetic layer.

7. The magnetic writer of claim 1, wherein the biasing antiferromagnetic layer biases the return pole parallel to an air bearing surface of the magnetic writer.

8. The magnetic writer of claim 1, wherein at least a portion of the return pole comprises a soft magnetic material with a low magnetic moment.

9. The magnetic writer of claim 8, wherein the at least a portion of the return pole is located across a write gap from the main pole.

10. A magnetic head including a write element comprising:
a main pole including a multiple layer first portion and a multiple layer second portion, wherein at least one of the first portion and the second portion includes two magnetic layers having substantially antiparallel magnetizations and separated by a first nonmagnetic layer;
a return pole across a write gap from the main pole; and
a biasing layer comprised of a non-oxide antiferromagnetic material and coupled to a surface of the return pole adjacent the write gap for biasing the return pole
wherein the first portion and the second portion are non-coplanar.

11. The magnetic head of claim 10, wherein the magnetic layers are ferromagnetic layers.

12. The magnetic head of claim 10, and further comprising:
a second nonmagnetic layer between the first portion and the second portion.

13. The magnetic head of claim 10, wherein the first portion comprises a high magnetic moment material.

14. The magnetic head of claim 10, wherein the second portion comprises a soft magnetic material having high permeability and low coercivity.

15. The magnetic head of claim 10, wherein the return pole is a multilayer structure comprising ferromagnetic layers antiferromagnetically coupled to each other by a non-magnetic layer.

16. The magnetic writer of claim 15, wherein one of the ferromagnetic layers of the return pole comprises a soft magnetic material having a saturation magnetic flux density of about 1.5 T or less.

17. The magnetic writer of claim 16, wherein the soft magnetic material is selected from the group consisting of $Ni_{79}Fe_{21}$, CoZn, CoNbZn, and alloys thereof.

18. A magnetic writer comprising:
a main pole including a multiple layer first portion and a multiple layer second portion, wherein at least one of the first portion and the second portion includes two ferromagnetic layers having substantially antiparallel magnetizations and separated by a first nonmagnetic layer;
a return pole across a write gap from the main pole; and
a biasing layer comprised of an antiferromagnetic material adjacent the return pole at the write gap for biasing the return pole.

19. The magnetic writer of claim 16, further comprising:
a second nonmagnetic layer between the first portion and the second portion.

20. The magnetic writer of claim 18, wherein the return pole is a multilayer structure comprising ferromagnetic layers antiferromagnetically coupled to each other by a non-magnetic layer.

21. The magnetic writer of claim 18, wherein the biasing antiferromagnetic layer biases the return pole parallel to an air bearing surface.

* * * * *